Patented June 12, 1945

2,378,194

UNITED STATES PATENT OFFICE 2,378,194

INTERPOLYMERIZATION PRODUCTS OF VINYL CHLORIDE AND DI-ESTERS OF ITACONIC ACID

Gaetano F. D'Alelio, Pittsfield, Mass., assignor to General Electric Company, a corporation of New York No Drawing. Application April 11, 1942, Serial No. 438,590

12 Claims. (Cl. 260—78)

This invention relates to the production of interpolymers (copolymers) having valuable and characteristic properties that make them especially suitable for use in industry, for example, in molding, laminating, casting, coating and adhesive applications, and for other purposes. The invention is concerned more particularly with compositions of matter comprising interpolymers of mixtures comprising vinyl chloride and a di-ester of itaconic acid, said ester having the general formula:

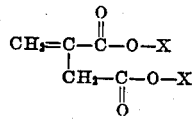

wherein X is selected from the class consisting of R and $CH_2$—$CH_2$—O—R', R being an alkyl radical having at least 2 but no more than 10 carbon atoms and R' is an alkyl radical having no more than 8 carbon atoms. Examples of alkyl radicals that R and R' may be are: ethyl, propyl, isopropyl, butyl, isobutyl, tert.-butyl, sec.-butyl, amyl, sec.-amyl, isoamyl, tert.-amyl, hexyl, heptyl and octyl, in addition, R may be nonyl and decyl, and R' may be methyl.

In my copending application, Serial Number 294,493, filed September 12, 1939, now Patent 2,279,881 dated April 14, 1942, and assigned to the same assignee as the present invention, I have disclosed that various propyl and butyl esters of itaconic acid may be copolymerized with vinyl chloride. In my copending application, Serial Number 294,494, filed September 12, 1939, now Patent 2,279,882 dated April 14, 1942, and assigned to the same assignee as the present invention, I have disclosed that various alkoxy ethyl esters of itaconic acid may be copolymerized with vinyl chloride. In my copending application, Serial Number 294,495, filed September 12, 1939, now Patent 2,279,883, dated April 14, 1942, and assigned to the same assignee as the present invention, I have disclosed that various alkyl esters of itaconic acid, specifically those esters having more than 6 carbon atoms in the alkyl group of the ester radical, may be copolymerized with vinyl chloride. In my copending application, Serial Number 294,497, filed September 12, 1939, now Patent 2,279,885 dated April 14, 1942, and assigned to the same assignee as the present invention, I have disclosed that various optically inactive amyl esters of itaconic acid may be copolymerized with vinyl chloride.

I have now discovered that when an itaconic ester having the structural formula given previously is copolymerized with vinyl chloride in the proportion of less than 10 per cent of the former to more than 90 per cent of the latter, products having increased flexural and impact strength as compared to straight polyvinyl chloride are produced. This is very surprising since the itaconic esters have very low flexural strength compared to polyvinyl chloride.

Various proportions of components may be used in preparing the copolymers of this invention, but ordinarily the vinyl chloride will constitute at least 90 per cent by weight of the mixed monomers or partial polymers. Thus, 1 per cent by weight of an itaconic ester having the structural formula given previously may be polymerized with 99 per cent vinyl chloride to yield a copolymer having a higher flexural strength than polymeric vinyl chloride alone. In general, I prefer to interpolymerize a monomeric or partially polymerized itaconic ester having the structural formula given previously with monomeric or partially polymerized vinyl chloride in the ratio of, by weight, from 1 to 6 per cent of the former to from 99 to 94 per cent of the latter, since within these ratios the products have the maximum flexural and impact strengths. Compositions having between 6 and less than 10 percent of an itaconic ester have flexural strengths of the same order as that for polyvinyl chloride but the impact strength is greater. Increasing the itaconic ester to greater than 10 per cent produces copolymers having both impact and flexural strengths which are inferior to straight polyvinyl chloride.

Other modifying bodies may be incorporated into the composition before, during or after the polymerization. These modifying bodies may be of high or low molecular weight, with or without resinous characteristics. The modifying body may be a polymerizable compound or compounds, e. g., vinyl chlorobenzoate, chlorobenzyl acrylate, etc. As modifying agents various fillers may be used, for example wood flour, alpha flock, sand, asbestos, mica, paper, cloth, cellulose derivatives such as cellulose itself, regenerated cellulose, cellulose esters, cellulose ethers, natural and synthetic filaments or fibers, etc., in continuous, shredded or comminuted form. Pigments, dyes, opacifiers, plasticizing substances, such as dibutyl phthalate, esters or monobasic and polybasic saturated and unsaturated acids, esters of aromatic monobasic and polybasic acids, etc., may be incorporated into the copolymers of this invention to modify the same. Synthetic and natural resins, gums, oils, waxes, polyhalogenated aromatic derivatives, etc., likewise may be added as modifying agents.

Heat, light, or heat and light may be used to effect copolymerization between the components, although under such conditions the rate of polymerization is relatively slow. Hence, to accelerate the polymerization I prefer to use a catalyst accompanied by heat, light, or heat and light. Examples of polymerization catalysts which may be intimately associated with the mixed monomers or partial polymers to effect copolymerization therebetween are oxygen, ozone, hydrogen peroxide, sulfuric acid, aluminum chloride, boron fluoride, super-oxides such as aliphatic acyl peroxides, e. g., acetyl peroxide, stearyl peroxide, etc., peroxides of the aromatic acid series, e. g., benzoyl peroxide. Benzoyl peroxide is the preferred catalyst because of its ease of handling, its relative freedom from explosive hazards and its ready solubility in the monomeric or partially polymerized materials. The rate of polymerization is a function of the temperature, and may be carried out at from room temperature (20° to 30° C.) to temperatures materially above 100° C., for example about 130° C. Pressure tight vessels are used to prevent the loss of monomeric vinyl chloride.

In order that those skilled in the art better may understand how the present invention may be carried into effect, the following illustrative examples are given. All parts are by weight. In all of the examples 0.25 per cent by weight of benzoyl peroxide was used as polymerization catalyst. All the samples were sealed in glass tubes and polymerized according to the following polymerization schedule; 96 hours at room temperature while exposed to direct sunlight, 240 hours at 55° C. The tubes were then opened and the copolymers molded at 160° C. under a pressure of 3,000 pounds per square inch for 4 minutes. The mold was cooled to room temperature before the pressure was removed and the molded piece ejected. Dynstat flexural and impact tests were measured on samples cut from the molded discs.

*Example 1*

| | Parts |
|---|---|
| Vinyl chloride | 99 |
| Di-ethyl itaconate | 1 |

The above composition when polymerized and molded as described above produced a copolymer which had a flexural strength of 14,030 pounds per square inch and an impact strength of 0.316 foot pound. A polymer of straight vinyl chloride produced from the same vinyl chloride and under the same conditions as the above copolymer had a flexural strength of 12,505 pounds per square inch and an impact strength of 0.104 foot pound. The copolymer therefor has an impact strength 304 per cent better and a flexural strength 112 per cent better than that of polyvinyl chloride.

*Example 2*

When 1 part of the following itaconic esters were substituted for the 1 part di-ethyl itaconate in the above example the following flexural and impact strengths were measured for the molded pieces.

| | Impact strength | Flexural strength |
|---|---|---|
| | Lbs. per sq. in. | Ft. lbs. |
| Di-n-propyl itaconate | 0.242 | 15,485 |
| Di-isopropyl itaconate | 0.212 | 13,450 |
| Di-n-butyl itaconate | 0.459 | 12,730 |
| Di-isobutyl itaconate | 0.254 | 13,710 |
| Di-isoamyl itaconate | 0.165 | 15,665 |
| Di-decyl itaconate | 0.224 | 13,590 |
| Di-(ethoxy-ethyl) itaconate | 0.241 | 13,950 |
| Di-(butoxy-ethyl) itaconate | 0.215 | 13,795 |

It is to be noticed that the above copolymers show an increase in flexural strength over that for polymerized vinyl chloride ranging from 102 per cent to 124 per cent while the impact strength is increased by 159 to 442 per cent.

When 1 part di-allyl itaconate is substituted for the 1 part di-ethyl itaconate in Example 1, the copolymer has a flexural strength of 15,750 pounds per square inch but the impact strength is only 0.057 foot pound.

*Example 3*

| | Parts |
|---|---|
| Vinyl chloride | 95 |
| Di-ethyl itaconate | 5 |

When the above components were polymerized and molded as described previously the copolymer had a flexural strength of 13,110 pounds per square inch and an impact strength of 0.209 foot pound. This copolymer shows an increase over polymerized vinyl chloride of 105 per cent in flexural strength and 201 per cent in impact strength.

*Example 4*

When 5 parts of the following itaconic esters were substituted for the 5 parts of di-ethyl itaconate in Example 3, the following flexural and impact strengths were measured on the molded pieces.

| | Impact strength | Flexural strength |
|---|---|---|
| | Lbs. per sq. in. | Ft. lbs. |
| Di-isopropyl itaconate | 0.278 | 13,325 |
| Di-isobutyl itaconate | 0.125 | 13,330 |
| Di-sec.-butyl itaconate | 0.177 | 13,440 |
| Di-decyl itaconate | 0.289 | 13,340 |
| Di-(ethoxy-ethyl) itaconate | 0.443 | 12,605 |

The above copolymers show an increase over that for polymerized vinyl chloride of 101 to 107 per cent in flexural strength and 123 to 426 per cent in impact strength.

When 5 parts di-phenyl itaconate is substituted for the 5 parts of di-ethyl itaconate in Example 3 the molded piece had a flexural strength of only 10,840 pounds per square inch and an impact strength of only 0.020 foot pound.

*Example 5*

In the following table results are recorded for copolymers of 10 per cent of the indicated itaconic ester and 90 per cent vinyl chloride. It is to be noted that in every case the flexural strength has decreased to less than that for polymerized vinyl chloride while almost 50 per cent of the impact strength values are less than that for polymerized vinyl chloride. These results definitely indicate that the itaconic ester concentration in the copolymer should be kept below 10 per cent and preferably in the range of 0.1 to 6 per cent to obtain copolymers of maximum flexural and impact strength.

|  | Impact strength | Flexural strength |
|---|---|---|
|  | Lbs. per sq. in. | Ft. lbs. |
| Di-ethyl itaconate | 0.043 | 7,820 |
| Di-isopropyl itaconate | 0.067 | 8,010 |
| Di-n-butyl itaconate | 0.086 | 11,770 |
| Di-isobutyl itaconate | 0.112 | 10,790 |
| Di-octyl itaconate | 0.188 | 8,905 |
| Di-decyl itaconate | 0.127 | 4,015 |
| Di-(butoxy-ethyl) itaconate | 0.146 | 10,065 |

The mixed monomers or partial polymers used in carrying the present invention into effect may be interpolymerized in molds with or without the application of heat, in the presence or absence of a material which is a solvent for the monomer but not for the interpolymer, or one which is a solvent for both monomer and interpolymer, or one which is not a solvent for either the monomer or interpolymer so that spongy or granulated polymeric modifications are obtained.

The solid interpolymers of this invention, with or without modifying agents, may be used in injection, compression, or transfer molding processes to make numerous articles for industrial, technical and novelty use and other applications.

Various heat, light, or heat and light stabilizers may be incorporated into the plastic masses of this invention before, during or after interpolymerization. Various stabilizers that may be used are the poly-alkyl and polyaryl lead salts of the fatty acid series. Stabilizers that I have found especially suitable are the aryloxy lead salts of fatty acids having more than 10 carbon atoms in the acid radical, e. g., phenoxy lead stearate, toloxy lead palmitate, etc. Numerous other examples of the latter type stabilizer are disclosed and claimed in a copending application of R. W. Staley, Serial No. 435,636, filed March 21, 1942, now Patent 2,340,151 dated January 25, 1944, and assigned to the same assignee as the present invention.

In solvents, or without solvents utilizing a melt process, the fusible polymers may be used in adhesive and laminating applications to bond paper, wood, mica flakes, glass sheets, rubber sheets, fibrous materials such as silk, asbestos, glass fibers, synthetic fibers in filament, thread or fabric (woven or felted) form, etc., cellulose derivatives in sheet, comminuted or fiber form, etc. In the form of liquid coating compositions such as lacquers, enamels, varnishes, etc., they find application in surface protective coatings, such as for walls, desks, wire, concrete, porcelains, etc. In a flowable condition without the use of solvents they may be used as impregnants for many porous bodies, such as a cork, pottery, felts, or fabricated bodies with intersticies, such as the windings of electrical coils, netted fiber, interwoven fibrous materials, etc.

What I claim as new and desire to secure by Letters Patent of the United States, is:

1. An interpolymer of more than 90 per cent but not exceeding 99.9% of vinyl chloride and at least 0.1 per cent but less than 10 per cent of an itaconic ester having the structural formula:

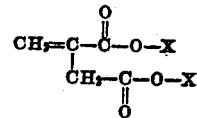

wherein X is selected from the class consisting of R and $CH_2-CH_2-O-R'$, R being an alkyl radical having at least 2 but not more than 10 carbon atoms and R' being an alkyl radical having not more than 8 carbon atoms.

2. An interpolymer of more than 90 per cent but not exceeding 99.9% of vinyl chloride and at least 0.1 per cent but less than 10 per cent of di-ethyl itaconate.

3. An interpolymer of more than 90 per cent but not exceeding 99.9% of vinyl chloride and at least 0.1 per cent but less than 10 per cent of di-isopropyl itaconate.

4. An interpolymer of more than 90 per cent but not exceeding 99.9% of vinyl chloride and at least 0.1 per cent but less than 10 per cent of di-(ethoxy-ethyl) itaconate.

5. As a new product, a hard tough copolymer resulting from the interpolymerization of vinyl chloride and di-ethyl itaconate in the ratio of, by weight, 99 to 94 per cent of the former to from 1 to 6 per cent of the latter, said copolymer having a flexural and impact strength greater than that of polymerized vinyl chloride.

6. As a new product, an interpolymer of 99 parts vinyl chloride and 1 part di-ethyl itaconate.

7. As a new product, a hard tough copolymer resulting from the interpolymerization of vinyl chloride and di-isopropyl itaconate in the ratio of, by weight, 99 to 94 per cent of the former to from 1 to 6 per cent of the latter, said copolymer having a flexural and impact strength greater than that of polymerized vinyl chloride.

8. As a new product, an interpolymer of 99 parts vinyl chloride and 1 part di-isopropyl itaconate.

9. As a new product, a hard tough copolymer resulting from the interpolymerization of vinyl chloride and di-(ethoxy-ethyl) itaconate in the ratio of, by weight, 99 to 94 per cent of the former to from 1 to 6 per cent of the latter, said copolymer having a flexural and impact strength greater than that of polymerized vinyl chloride.

10. As a new product, an interpolymer of 95 parts vinyl chloride and 5 parts di-(ethoxy-ethyl) itaconate.

11. The method of improving the flexural and impact strength of polymerized vinyl chloride which comprises copolymerizing more than 90 per cent but not exceeding 99.9% of vinyl chloride with at least 0.1 per cent but less than 10 per cent of an itaconic ester having the structural formula:

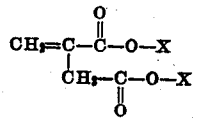

wherein X is selected from the class consisting of R and $CH_2-CH_2-O-R'$, R being an alkyl radical having at least 2 but not more than 10 carbon atoms and R' is an alkyl radical having not more than 8 carbon atoms.

12. The method as in claim 11 wherein the itaconic ester is di-ethyl itaconate.

GAETANO F. D'ALELIO.